US012694362B2

(12) United States Patent
Kim et al.

(10) Patent No.: US 12,694,362 B2
(45) Date of Patent: Jul. 28, 2026

(54) CONTROL APPARATUS AND LOGISTICS SYSTEM INCLUDING THE SAME

(71) Applicant: SEMES CO., LTD., Chungcheongnam-do (KR)

(72) Inventors: Yoon Whoi Kim, Chungcheongnam-do (KR); Seung Jun Lee, Chungcheongnam-do (KR); Ji Keun Song, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 458 days.

(21) Appl. No.: 18/384,812

(22) Filed: Oct. 27, 2023

(65) Prior Publication Data

US 2024/0144158 A1 May 2, 2024

(30) Foreign Application Priority Data

Oct. 28, 2022 (KR) ........................ 10-2022-0141727

(51) Int. Cl.
*G06Q 10/0832* (2023.01)
*G01C 3/00* (2006.01)

(52) U.S. Cl.
CPC ........... *G06Q 10/0832* (2013.01); *G01C 3/00* (2013.01)

(58) Field of Classification Search
CPC .... G06Q 10/0832; G06Q 10/08; G06Q 50/10; G01C 3/00; B65D 25/10; F17C 13/02; F17C 13/04; F17C 13/084; F17C 13/085; F17C 2205/0103; F17C 2205/0126; F17C 2205/013; F17C 2205/0161; F17C 2205/05; F17C 2205/054; F17C 2270/0518; B25J 5/00; B25J 9/1679; B25J 11/008;

(Continued)

(56) References Cited

U.S. PATENT DOCUMENTS

| | | | | |
|---|---|---|---|---|
| 2022/0016788 A1* | 1/2022 | Kim | ........................ | B25J 9/1679 |
| 2022/0274780 A1* | 9/2022 | Byeon | .................. | G06K 7/1413 |
| 2023/0249350 A1* | 8/2023 | Ha | ........................ | B25J 15/0038 |
| | | | | 414/222.02 |

FOREIGN PATENT DOCUMENTS

| | | | | |
|---|---|---|---|---|
| CN | 107074337 A | * | 8/2017 | ................ B63J 3/00 |
| CN | 118224518 A | * | 6/2024 | ................ F17D 5/00 |

(Continued)

OTHER PUBLICATIONS

KR102833442_EN_description_with_paragraph_numbers_espacenet (Year: 2025).*

(Continued)

*Primary Examiner* — Jacob S. Scott
*Assistant Examiner* — Erin Morris
(74) *Attorney, Agent, or Firm* — WOMBLE BOND DICKINSON (US) LLP

(57) ABSTRACT

A control apparatus for automating teaching between a gas cylinder transport apparatus and a gas cylinder storage apparatus and a logistics system including the control apparatus are provided. The logistics system includes: a gas cylinder transport apparatus transferring gas cylinders containing process gases; a gas cylinder storage apparatus storing the gas cylinders; and a control apparatus controlling the gas cylinder transport apparatus and the gas cylinder storage apparatus, wherein the control apparatus performs auto-teaching for operations between the gas cylinder transport apparatus and the gas cylinder storage apparatus.

20 Claims, 10 Drawing Sheets

(58) Field of Classification Search

CPC ..... B25J 13/006; B25J 13/08; H10P 72/0606; H10P 72/0618; H10P 72/3212; H10P 72/50

See application file for complete search history.

(56) References Cited

FOREIGN PATENT DOCUMENTS

| | | | | | |
|----|----------------|------|---|---------|------------------|
| DE | 202017106138 | U1 | * | 11/2017 | ............. B60P 3/228 |
| EP | 994432 | A1 | * | 4/2000 | |
| KR | 10-2132170 | | | 7/2020 | |
| KR | 102132170 | B1 | * | 7/2020 | ......... B66F 9/07563 |
| KR | 10-2021-0014059 | | | 2/2021 | |
| KR | 10-2021-0063719 | | | 6/2021 | |
| KR | 20210063719 | A | * | 6/2021 | ............. H10P 72/00 |
| KR | 20210068883 | A | * | 6/2021 | ............. H10P 72/00 |
| KR | 10-2021-0115424 | A | | 9/2021 | |
| KR | 10-2022-0010965 | A | | 1/2022 | |
| KR | 10-2022-0013840 | | | 2/2022 | |
| KR | 10-2022-0029082 | | | 3/2022 | |
| KR | 102833442 | B1 | * | 7/2025 | ........... F17C 13/045 |
| TW | 202233987 | A | * | 9/2022 | ............. F17C 13/00 |

OTHER PUBLICATIONS

Notice of Allowance dated Dec. 11, 2024 for Korean Patent Application No. 10-2022-0141727 and its English translation from Global Dossier.

Office action from the corresponding Korean Patent Application No. 10-2022-0141727 dated Apr. 12, 2024 with English translation from Global Dossier.

* cited by examiner

|  | #1 IO | #2 IO | #3 IO | #4 IO | #5 IO | #6 IO | #7 IO | #8 IO |
|---|---|---|---|---|---|---|---|---|
| PIO(A): MR | OFF | OFF | OFF | OFF | OFF | OFF | OFF | OFF |
| PIO(P): SQ | OFF | OFF | OFF | OFF | OFF | OFF | OFF | OFF |

FIG. 10

|  | #1 IO | #2 IO | #3 IO | #4 IO | #5 IO | #6 IO | #7 IO | #8 IO |
|---|---|---|---|---|---|---|---|---|
| PIO(A): MR | ON | ON | ON | ON | ON | ON | ON | ON |
| PIO(P): SQ | ON | ON | ON | ON | OFF | OFF | OFF | OFF |

FIG. 11

|  | #1 IO | #2 IO | #3 IO | #4 IO | #5 IO | #6 IO | #7 IO | #8 IO |
|---|---|---|---|---|---|---|---|---|
| PIO(A): MR | ON | ON | ON | ON | ON | ON | ON | ON |
| PIO(P): SQ | ON | ON | ON | ON | ON | OFF | OFF | OFF |

FIG. 12

|  | #1 IO | #2 IO | #3 IO | #4 IO | #5 IO | #6 IO | #7 IO | #8 IO |
|---|---|---|---|---|---|---|---|---|
| PIO(A): MR | ON | ON | ON | ON | ON | ON | ON | ON |
| PIO(P): SQ | ON | ON | ON | ON | ON | OFF | OFF | ON |

FIG. 14

|            | #1 IO | #2 IO | #3 IO | #4 IO | #5 IO | #6 IO | #7 IO | #8 IO |
|------------|-------|-------|-------|-------|-------|-------|-------|-------|
| PIO(A): MR | OFF   | OFF   | OFF   | OFF   | OFF   | OFF   | OFF   | OFF   |
| PIO(P): SQ | ON    | ON    | ON    | ON    | ON    | OFF   | OFF   | ON    |

FIG. 15

|            | #1 IO | #2 IO | #3 IO | #4 IO | #5 IO | #6 IO | #7 IO | #8 IO |
|------------|-------|-------|-------|-------|-------|-------|-------|-------|
| PIO(A): MR | ON    | ON    | ON    | ON    | ON    | ON    | ON    | ON    |
| PIO(P): SQ | OFF   | OFF   | OFF   | OFF   | OFF   | OFF   | OFF   | OFF   |

CONTROL APPARATUS AND LOGISTICS SYSTEM INCLUDING THE SAME

CROSS-REFERENCE TO RELATED APPLICATION

This application claims priority from Korean Patent Application No. 10-2022-0141727 filed on Oct. 28, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to a control apparatus and a logistics system including the same, and more particularly, to a control apparatus used in a system for storing, transporting, and supplying gases for use in semiconductor manufacturing processes, and a logistics system including the same.

2. Description of the Related Art

Semiconductor devices can be formed on silicon wafers, which are used as semiconductor substrates, through a series of manufacturing processes. These semiconductor devices can be individualized through a dicing process and manufactured into semiconductor packages through die bonding and packaging processes.

Various types of process gases can be supplied for the manufacture of semiconductor devices. These process gases are stored in cylinder-shaped storage containers and can be supplied to each process equipment. The gas cylinders are stored and managed in separate storage units.

However, due to insufficient automation, the manual handling of gas cylinders for transportation and storage purposes is currently prevalent. Since this manual handling poses a risk of accidents, appropriate measures are needed to address this and other issues.

SUMMARY

Aspects of the present disclosure provide a control apparatus for automating teaching between a gas cylinder transport apparatus and a gas cylinder storage apparatus, and a logistics system including the control apparatus.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a logistics system includes: a gas cylinder transport apparatus transferring gas cylinders containing process gases; a gas cylinder storage apparatus storing the gas cylinders; and a control apparatus controlling the gas cylinder transport apparatus and the gas cylinder storage apparatus, wherein the control apparatus performs auto-teaching for operations between the gas cylinder transport apparatus and the gas cylinder storage apparatus.

According to another aspect of the present disclosure, a logistics system includes: a gas cylinder transport apparatus transferring gas cylinders containing process gases, the gas cylinder transport apparatus including a distance measuring sensor; a gas cylinder storage apparatus storing the gas cylinders, the gas cylinder storage apparatus including a plurality of ports, which provide storage spaces for the gas cylinders, and support blocks, which are installed in each of the ports and in which each of the gas cylinders is placed; and a control apparatus controlling the gas cylinder transport apparatus and the gas cylinder storage apparatus, wherein the control apparatus performs auto-teaching for operations between the gas cylinder transport apparatus and the gas cylinder storage apparatus in an order of the entry into a teaching mode, port teaching, and the release from the teaching mode, the port teaching includes calculating a position of the support blocks based on identification information installed on the support blocks and storing the calculated position as a loading/unloading position for each of the gas cylinders, the control apparatus calculates the position of the support blocks based on a distance between the gas cylinder transport apparatus and the support blocks, measured by the distance measuring sensor, the gas cylinder transport apparatus and the gas cylinder storage apparatus include a plurality of parallel input/output (PIO) sensors, which communicate with one another, and the PIO sensors allow the ports to enter the teaching mode, and open or close doors installed in the ports.

According to another aspect of the present disclosure, a control apparatus controls a gas cylinder transport apparatus, which transfers gas cylinders containing process gases, and a gas cylinder storage apparatus, which stores the gas cylinders, wherein the control apparatus performs auto-teaching for operations between the gas cylinder transport apparatus and the gas cylinder storage apparatus in an order of the entry into a teaching mode, port teaching, and the release from the teaching mode, and loading/unloading of the gas cylinders is performed after the auto-teaching.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which:

FIGS. 9 through 12 are first through fourth exemplary views, respectively, illustrating steps of an auto-teaching method between the gas cylinder transport apparatus and the gas cylinder storage apparatus;

FIGS. 14 and 15 are fifth and sixth exemplary views, respectively, illustrating the steps of the auto-teaching method between the gas cylinder transport apparatus and the gas cylinder storage apparatus.

DETAILED DESCRIPTION

Figure 1:
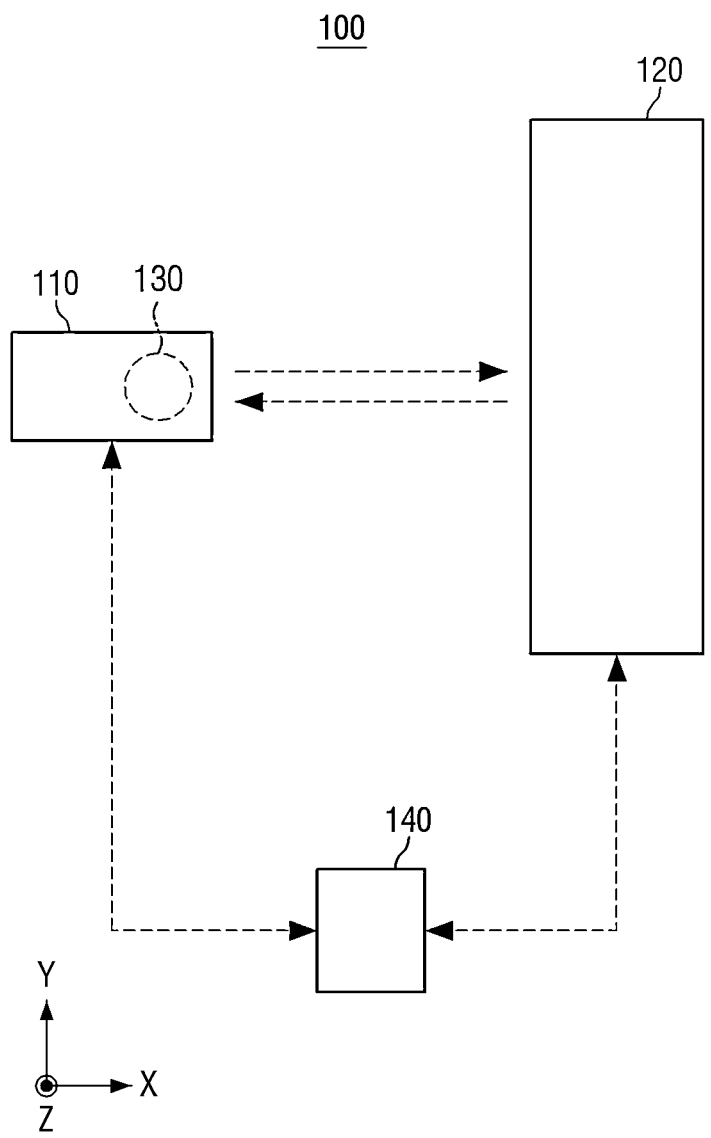
FIG. 1 is a schematic view illustrating the internal configuration of a logistics system for the transportation and storage of a gas cylinder.

Embodiments of the present disclosure will be described with reference to the attached drawings. The same reference numerals are used for the same components in the drawings, and redundant descriptions for these components will be omitted.

The present disclosure relates to a control apparatus, which automates a teaching process between a gas cylinder transport apparatus and a gas cylinder storage apparatus, and a logistics system including the control apparatus. Further detailed explanations of the present disclosure will be given below with reference to the drawings.

First, the logistics system will hereinafter be described. FIG. 1 is a schematic view illustrating the internal configuration of a logistics system for the transportation and storage of a gas cylinder.

Referring to FIG. 1, a logistics system 100 may be configured to include a gas cylinder transport apparatus 110, a gas cylinder storage apparatus 120, a gas cylinder 130, and a control apparatus 140.

The gas cylinder transport apparatus 110 is designed for the transportation of the gas cylinder 130, which is used for supplying process gases in the manufacture of semiconductor devices or display devices. The gas cylinder transport apparatus 110 may be implemented as a mobile robot, for example, a mobile robot.

The gas cylinder transport apparatus 110 may include a transport vehicle 210, which is for transporting the gas cylinder 130, and a transport robot 220, which is placed on an upper part of the transport vehicle 210. The transport robot 220 may include a robot hand 222 to support the bottom surface of the gas cylinder 130, a hand driving unit 224, which is for moving the robot hand 222 horizontally and vertically, and a first gripper unit 226, which is for gripping side portions of the gas cylinder 130 supported on the robot hand 222.

Figure 2:
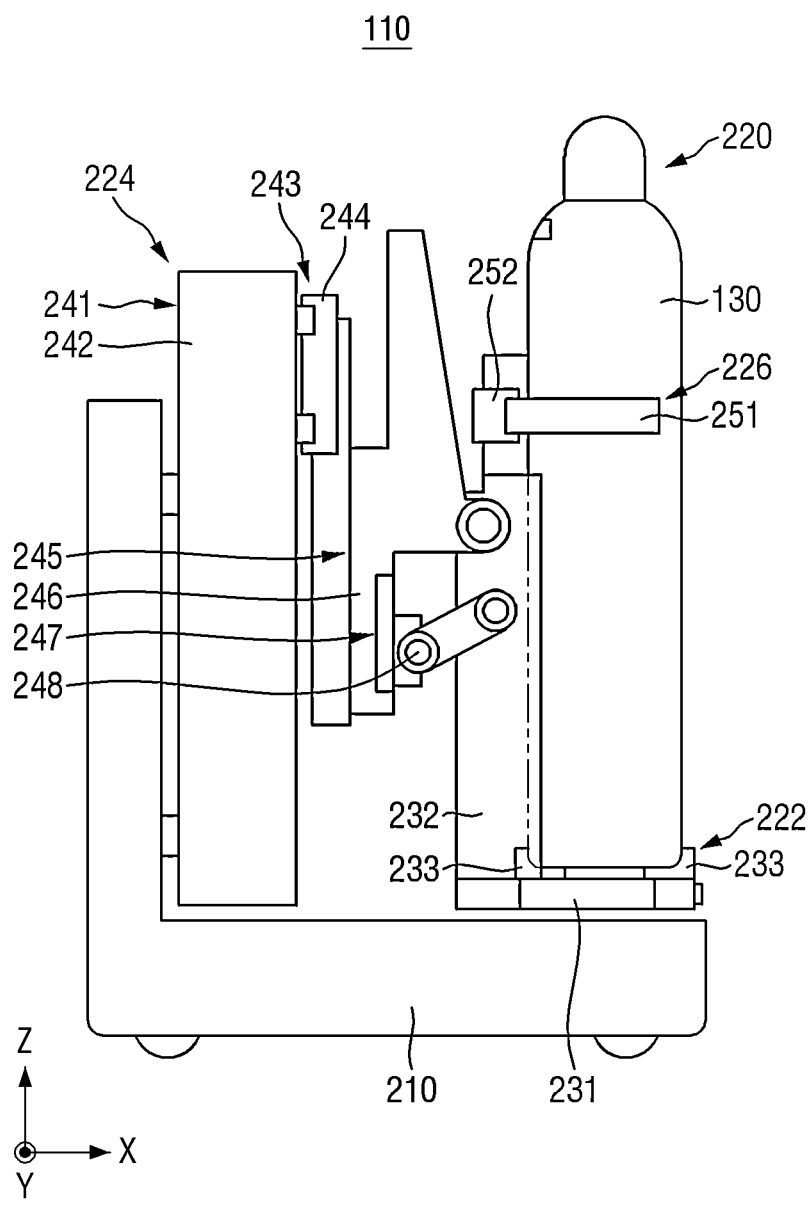
FIGS. 2 and 3 are a side view and a plan view, respectively, of a gas cylinder transport apparatus that constitutes a logistics system.
Figure 3:
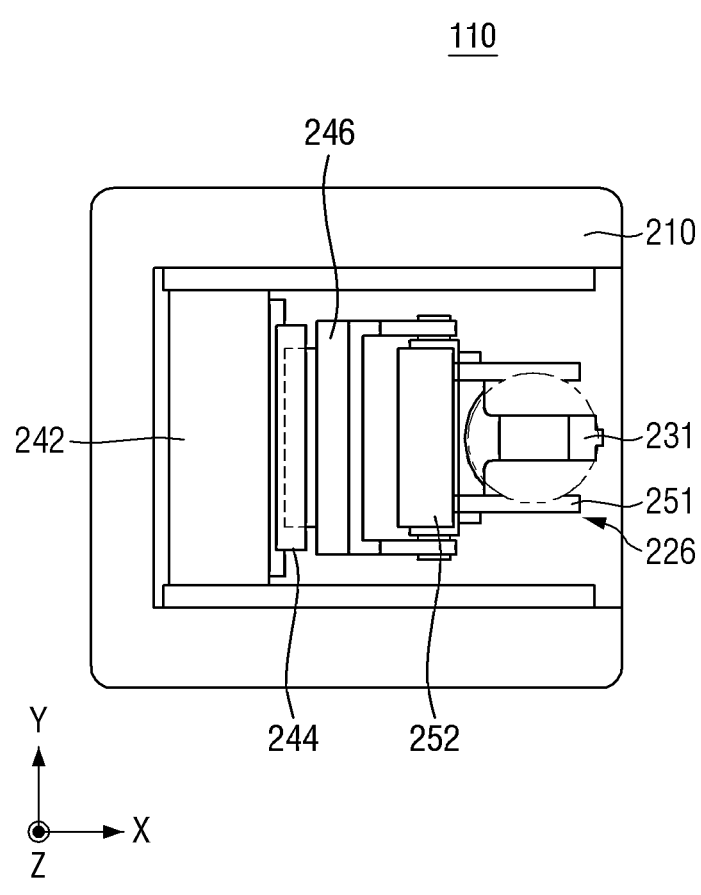

FIGS. 2 and 3 are a side view and a plan view, respectively, of a gas cylinder transport apparatus that constitutes the logistics system.

Referring to FIGS. 2 and 3, the robot hand 222 may include a support member 231, which extends in a front-to-rear direction (e.g., an X-axis direction) of the transport vehicle 210 to support the bottom surface of the gas cylinder 130, and a hand bracket 232, which extends vertically from a rear portion of the support member 231. A plurality of support pads 233, which are for supporting the gas cylinder 130, may be arranged on a front portion and the rear portion of the support member 231.

The hand driving unit 224 may move the robot hand 222 horizontally and vertically to pick up the gas cylinder 130. The hand driving unit 224 may include a first horizontal driving unit 24, which is for moving the robot hand 222 in the front-to-rear direction of the transport vehicle 210, a second horizontal driving unit 243, which is for moving the robot hand 222 in a left-to-right direction (e.g., a Y-axis direction) of the transport vehicle 210, and a vertical driving unit 245, which is for moving the robot hand 222 in the vertical direction, i.e., a Z-axis direction.

For example, the first horizontal driving unit 241 may include a first actuator 242, which is mounted on the transport vehicle 210 for longitudinal movement in the front-to-rear direction, and the second horizontal driving unit 243 may include a second actuator 244, which is mounted on the first actuator 242 for side-to-side movement in the left-to-right direction. Additionally, the vertical driving unit 245 may include a vertical actuator 246, which is mounted on the second actuator 244 for vertical movement.

The hand driving unit 224 may include a tilt driving unit 247, which adjusts the inclination of the robot hand 222 to tilt an upper part of the gas cylinder 130 rearward after the gas cylinder 130 is supported on the robot hand 222.

The tilt driving unit 247 may prevent the gas cylinder 130 from being detached from the robot hand 222 by adjusting the inclination of the robot hand 222 to tilt the upper part of the gas cylinder 130 rearward during the transportation of the gas cylinder 130.

In one example, the hand bracket 232 of the robot hand 222 may be mounted on a vertical driving unit 245 to rotate about an axis, and the tilt driving unit 247 may include a link member 248, which is connected to the hand bracket 232, and may be mounted on the vertical driving unit 245 to move the link member 248 in the vertical direction. However, the configuration of the tilt driving unit 247 is not particularly limited, but may vary. In another example, the tilt driving unit 247 may use a pneumatic cylinder to adjust the inclination of the robot hand 222.

The first gripper unit 226 may grip both the side portions of the gas cylinder 130 during the transportation of the gas cylinder 130 to prevent the gas cylinder 130 from falling. The first gripper unit 226 may be mounted on the hand bracket 232.

The first gripper unit 226 may include a pair of first gripper members 251, which are for gripping both side portions of the gas cylinder 130, and a first gripper driving unit 252, which is for operating the first gripper members 251. The first gripper members 251 may be arranged to face each other and may be moved closer to each other and farther away from each other by the first gripper driving unit 252. Although not illustrated in FIGS. 2 and 3, the first gripper driving unit 252 may include multiple rack gears, which are connected to the first gripper members 251, and a pinion gear, which engages between the multiple rack gears.

Referring back to FIG. 1, the gas cylinder storage apparatus 120 is designed for storing the gas cylinder 130, which is used for supplying process gases in the manufacture of semiconductor devices or display devices. The gas cylinder storage apparatus 120 may be provided, for example, as a storage queue. Moreover, as mentioned above, the process gases may be used to treat substrates used in the manufacture of semiconductor devices or display devices.

Figure 4:
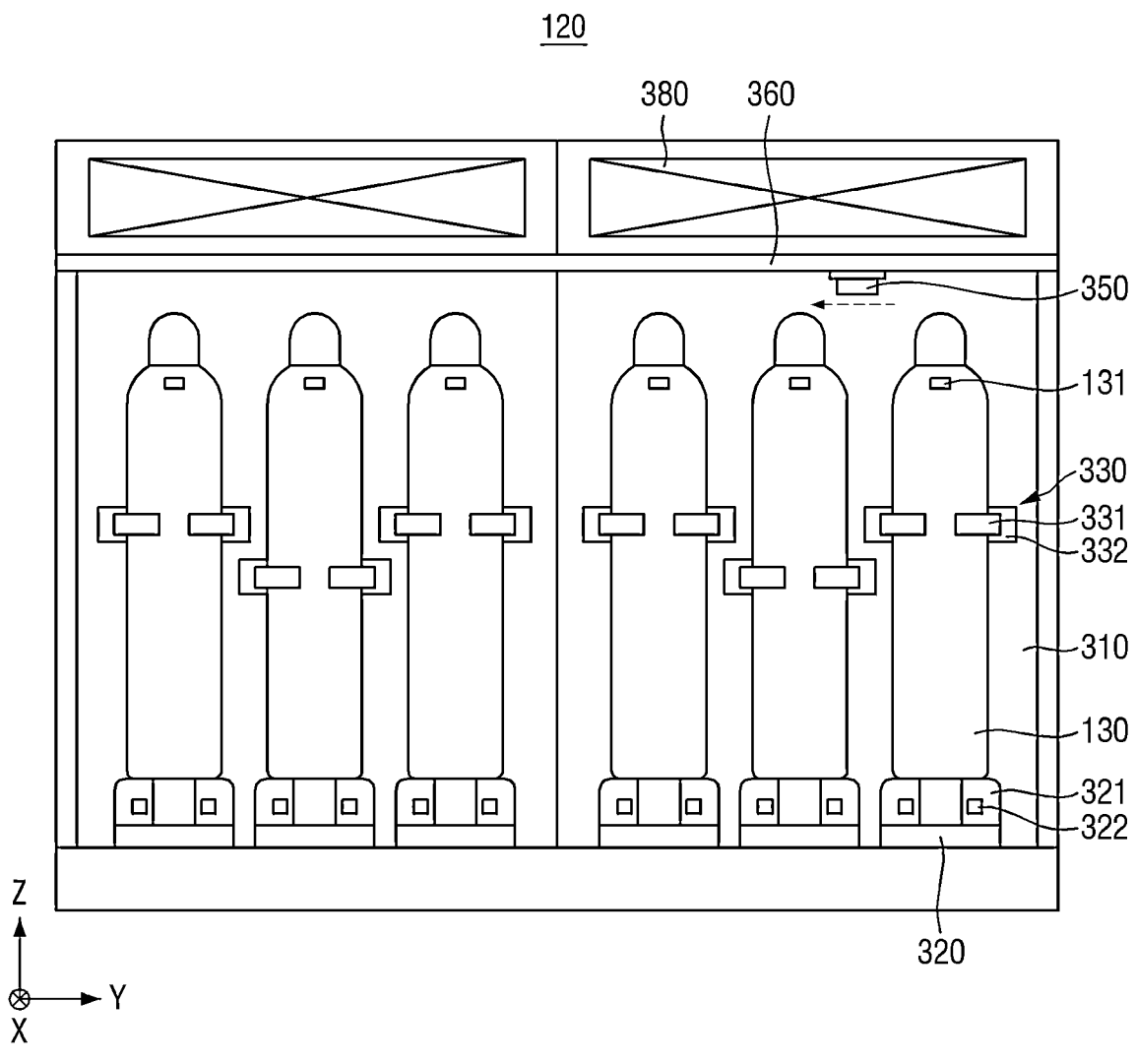
FIGS. 4 and 5 are a front view and a side view, respectively, of a gas cylinder storage apparatus that constitutes the logistics system.
Figure 5:
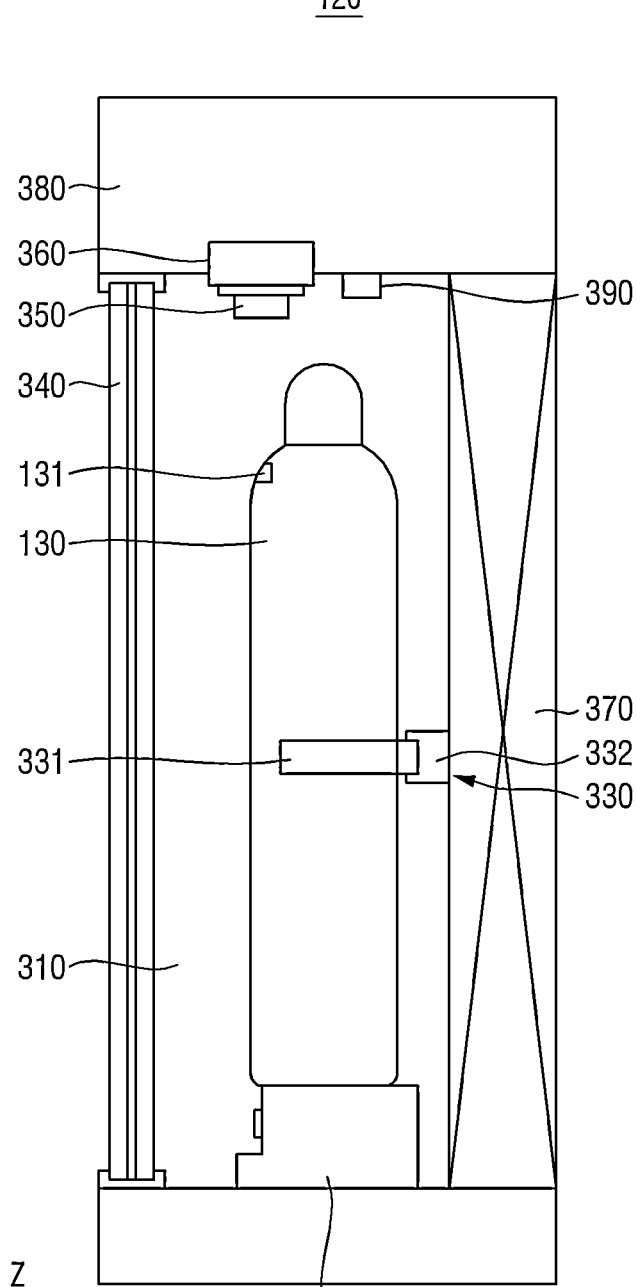

FIGS. 4 and 5 are a front view and a side view, respectively, of a gas cylinder storage apparatus that constitutes the logistics system.

Referring to FIGS. 4 and 5, the gas cylinder storage apparatus 120 may include a storage chamber 310, which is equipped with an internal space for storing gas cylinders 130, a plurality of stages 320, which are placed within the storage chamber 310 to support the gas cylinders 130, and a plurality of second gripper units 330, which are positioned within the storage chamber 310 to secure the gas cylinders 130.

The interior of the storage chamber 310 may be sealed from the outside. A plurality of doors 340 may be provided on a front portion of the storage chamber 310 to open and close the internal space of the storage chamber 310. Although not illustrated in FIGS. 4 and 5, when the gas cylinder transport apparatus 110 approaches the doors 340 for storing or retrieving the gas cylinders 130, one of the doors 340 may be opened by a door driving unit.

The second gripper unit 330 may include second gripper members 331, which are for gripping the side portions of each of the gas cylinders 130 and a second gripper driving unit 332, which is for operating the second gripper members 331.

Each of the gas cylinders 130 may be equipped with an information tag 131, in which historical information of the corresponding gas cylinder is stored. For example, the information tag 131 may store a series of information, such as material code representing the gas material stored in the corresponding gas cylinder, manufacturing number information, purity of the filled gas, manufacturing date information, expiration date information, and other relevant information. Within the storage chamber 310, an information acquisition unit 350 may be provided to obtain the historical information from the information tags 131 on the gas cylinders 130.

For example, barcode-form information tags 131 may be attached to the gas cylinders 130, and a barcode reader may be provided as the information acquisition unit 350 within the storage chamber 310 to read barcode information. Alternatively, in another example, QR code-form information tags 131 may be attached to the gas cylinders 130, and a QR code reader may be provided as the information acquisition unit 350 within the storage chamber 310 to read QR code information.

The gas cylinder storage apparatus 120 may include a third horizontal driving unit 360, which allows the information acquisition unit 350 to move horizontally and be adjacent to each of the information tags 131 on the gas cylinders 130. For example, the information tags 131 may be attached to the upper surfaces of the gas cylinders 130, and the information acquisition unit 350 may be horizontally moved from the top of each of the gas cylinder 130 by the third horizontal driving unit 360.

To prevent gas leakage from the gas cylinders 130, a constant temperature may preferably be maintained within the storage chamber 310. For this purpose, the gas cylinder storage apparatus 120 may include a temperature control unit 370, which keeps the interior of the storage chamber 310 at a predetermined temperature. Although not illustrated in FIGS. 4 and 5, the temperature control unit 370 may include a temperature sensor to measure the internal temperature of the storage chamber 310 and a heating or cooling device to regulate the internal temperature of the storage chamber 310.

The gas cylinder storage apparatus 120 may include a pressure control unit 380 to maintain the pressure inside the storage chamber 310 at a predetermined level. The pressure control unit 380 may keep the internal pressure of the storage chamber 310 lower than the external pressure to prevent gas leakage. For example, the pressure control unit 380 may provide a negative pressure inside the storage chamber 310, which is lower than atmospheric pressure.

For example, a fan filter unit may be placed on the top of the storage chamber 310, and any gas leakage from the gas cylinders 130 may be removed by the fan filter unit. The fan filter unit may be connected to a gas scrubber or a similar device for gas purification. Alternatively, in another example, the storage chamber 310 may be connected to a vacuum supply system, such as a vacuum pump or vacuum ejector, and the air and gas discharged by a vacuum supply system may be purified through the gas scrubber before being released outside.

To detect gas leakage, a gas sensor 390 may be installed inside the storage chamber 310. The gas cylinder storage apparatus 120 may determine the presence of gas leakage based on the output signal of the gas sensor 390. If gas leakage is detected from the gas cylinders 130, the gas cylinder storage apparatus 120 may generate an alarm signal to alert a user.

Figure 6:
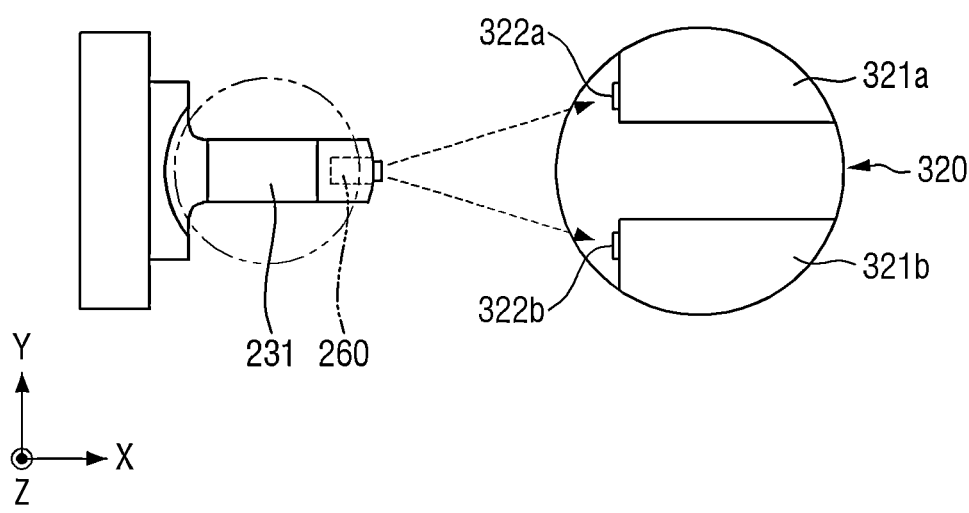
FIGS. 6 and 7 are an enlarged partial plan view and an enlarged partial side view, respectively, of a support member of a robot hand of the gas cylinder transport apparatus and a stage of the gas cylinder storage apparatus.
Figure 7:
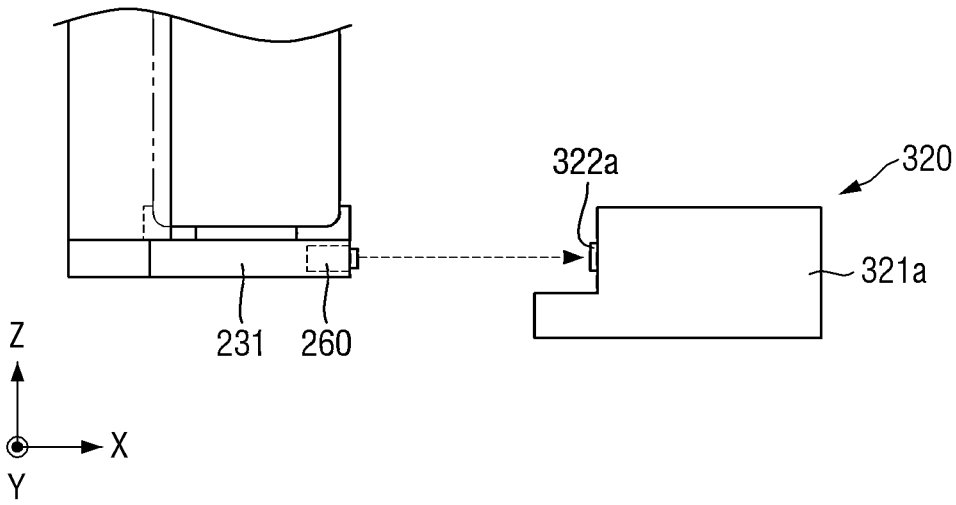

FIGS. 6 and 7 are an enlarged partial plan view and an enlarged partial side view, respectively, of a support member of a robot hand of the gas cylinder transport apparatus and a stage of the gas cylinder storage apparatus.

Referring to FIGS. 6 and 7, the support member 231 may extend in the front-to-rear direction (or longitudinal direction) of the transport vehicle 210. A stage 320 may include multiple support blocks to support the side portions of the bottom surface of a gas cylinder 130. For example, when loading the gas cylinder 130 onto the stage 320, the support member 231 may move forward between two different support blocks 321a and 321b by the first horizontal driving unit 241. Then, the gas cylinder 130 may be lowered onto the support blocks 321a and 321b by the vertical driving unit 245.

Conversely, when unloading the gas cylinder 130 from the stage 320, the support member 231 may move forward between the two different support blocks 321a and 321b by the first horizontal driving unit 241. Then, the gas cylinder 130 may be lifted from the support blocks 321a and 321b by the vertical driving unit 245.

Front portions of the support blocks 321a and 321b that face the support member 231 of the robot hand 222 may have alignment marks for alignment with the support member 231 of the robot hand 222 and the support blocks 321a and 321b of the stage 320. For example, QR codes 322a and 322b containing information on the stage 320 may be attached to the front portions of the support blocks 321a and 321b. The QR codes 322a and 322b may serve as alignment marks for alignment between the support member 231 and the support blocks 321a and 321b, and a distance measuring sensor 260 may be used as a QR code reader to read the QR codes 322a and 322b.

The distance measuring sensor 260 may measure the distance between the QR codes 322a and 322b. The distance and angle from the current position of the robot hand 222 to the support blocks 321a and 321b may be calculated based on measurements from the distance measuring sensor 260. The distance measuring sensor 260 may be, for example, a laser distance sensor (LDS) for distance measurement.

Alternatively, the distance measuring sensor 260 may be a sensor including a camera module. In this case, the distance measuring sensor 260 may acquire images containing the QR codes 322a and 322b. The gas cylinder transport apparatus 110 may detect the position coordinates of the QR codes 322a and 322b from the images obtained by the distance measuring sensor 260 and control the operation of the second horizontal driving unit 243 to place the support member 231 of the robot hand 222 between the support blocks 321a and 321b. The distance measuring sensor 260 may be, for example, a vision sensor specifically designed for QR code detection.

On the other hand, the gas cylinder transport apparatus 110 may include a camera module in addition to the distance measuring sensor 260, which is configured as an LDS for distance measurement. The camera module may be arranged parallel to the distance measuring sensor 260 in the left-toright direction (or the Y-axis direction) and/or parallel to the distance measuring sensor 260 in the vertical direction (or the Z-axis direction). In this case, the camera module, like the distance measuring sensor 260, may be mounted on a front portion of the support member 231.

Referring again to FIG. 1, the control apparatus 140 controls the operation of the gas cylinder transport apparatus 110 and the gas cylinder storage apparatus 120. Specifically, the control apparatus 140 may be provided in the logistics system 100 to automate a teaching process between the gas cylinder transport apparatus 110 and the gas cylinder storage apparatus 120.

Conventionally, the teaching process between the gas cylinder transport apparatus 110 and the gas cylinder storage apparatus 120 is manually conducted, requiring multiple operators to handle each of the gas cylinder transport apparatus 110 and the gas cylinder storage apparatus 120, resulting in inconvenience due to excessive work time and manpower.

Conversely, according to the embodiment of FIG. 1, the control apparatus 140 may automate the teaching process between the gas cylinder transport apparatus 110 and the gas cylinder storage apparatus 120. Specifically, parallel input/output (PIO) sensors may be installed in the gas cylinder transport apparatus 110 and the gas cylinder storage apparatus 120 to enable the automation of the teaching process between the gas cylinder transport apparatus 110 and the gas cylinder storage apparatus 120, and the teaching process for the storage location of the gas cylinders 130 in the gas cylinder storage apparatus 120 may be automated. The teaching process between the gas cylinder transport apparatus 110 and the gas cylinder storage apparatus 120 may involve entering teaching mode, performing a teaching process, and exiting the teaching mode.

Figure 8:
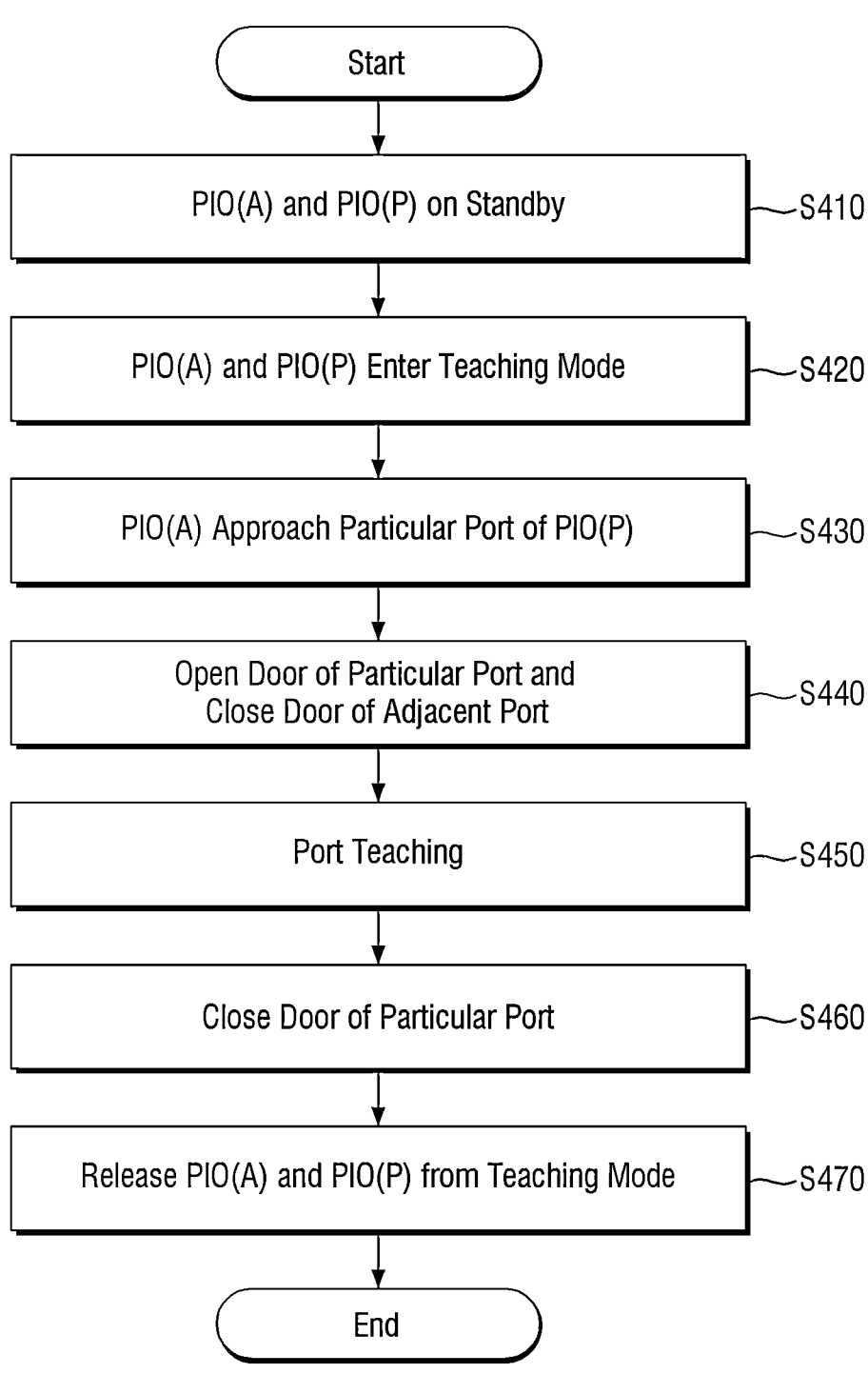
FIG. 8 is a flowchart illustrating an auto-teaching method between the gas cylinder transport apparatus and the gas cylinder storage apparatus.

FIG. 8 is a flowchart illustrating an auto-teaching method between the gas cylinder transport apparatus and the gas cylinder storage apparatus. Specifically, FIG. 8 illustrates a teaching process for the storage location of the gas cylinders 130.

Referring to FIGS. 1 and 8, the gas cylinder transport apparatus 110 and the gas cylinder storage apparatus 120 remain in a standby state before entering the teaching mode (S410). As mentioned earlier, the teaching mode may involve teaching the coordinates of the loading/unloading positions for the gas cylinders 130, but the present disclosure is not limited thereto. That is, an auto-teaching process between the gas cylinder transport apparatus 110 and the gas cylinder storage apparatus 120 may encompass nearly all processes related to the transportation and storage of the gas cylinders 130 until their completion.

The gas cylinder storage apparatus 120 may store multiple gas cylinders. In this case, the gas cylinders 130 may be stored in separate ports, and the ports may be opened and closed through separate doors. The gas cylinder storage apparatus 120 will hereinafter be described as being divided into four ports and having four doors for opening and closing the four ports. However, it should be noted that the structure of the gas cylinder storage apparatus 120 is not particularly limited.

As mentioned earlier, the gas cylinder transport apparatus 110 may be provided as a storage queue ("SQ"), and the gas cylinder storage apparatus 120 may be designed as a mobile robot ("MR"). Furthermore, as mentioned earlier, the auto-teaching process between the gas cylinder transport apparatus 110 and the gas cylinder storage apparatus 120 may be automated using PIO sensors. The gas cylinder transport apparatus 110, which operates actively, and the gas cylinder storage apparatus 120, which operates passively, will hereinafter be referred to as "PIO(A)" and "PIO(P)", respectively, where "A" stands for "active" and "P" stands for "passive."

As an example, the gas cylinder storage apparatus 120 may have eight input/output (IO) sensors, i.e., first through eighth IO sensors #1 IO through #8 IO. The first through eighth IO sensors #1 IO through #8 IO of the gas cylinder storage apparatus 120 may be defined as a second sensor group.

The first through eighth IO sensors #1 IO through #8 IO of the second sensor group may be used to control four ports, i.e., first through fourth ports. Specifically, the first through eighth IO sensors #1 IO through #8 IO of the second sensor group may be utilized to enter the teaching mode for the four ports and to open and close the doors installed in the four ports.

For example, the first IO sensor #1 IO of the second sensor group may be used to enter the teaching mode for the first port, and the fifth IO sensor #5 IO of the second sensor group may be used to open and close the door installed in the first port. Similarly, for example, the second IO sensor #2 IO of the second sensor group may be used to enter the teaching mode for the second port, and the sixth IO sensor #6 IO of the second sensor group may be used to open and close the door installed in the second port. Likewise, for example, the third IO sensor #3 IO of the second sensor group may be used to enter the teaching mode for the third port, and the seventh IO sensor #7 IO of the second sensor group may be used to open and close the door installed in the third port. Additionally, for example, the fourth IO sensor #4 IO of the second sensor group may be used to enter the teaching mode for the fourth port, and the eighth IO sensor #8 IO of the second sensor group may be used to open and close the door installed in the fourth port.

However, the present disclosure is not limited to this. Alternatively, the gas cylinder storage apparatus 120 may also have only one IO sensor that independently controls all the ports.

The gas cylinder transport apparatus 110, like the gas cylinder storage apparatus 120, may have eight IO sensors, i.e., first through eighth IO sensors #1 IO through #8 IO. The first through eighth IO sensors #1 IO through #8 IO of the gas cylinder transport apparatus 110 may be defined as a first sensor group. The first through eighth IO sensors #1 IO through #8 IO of the first sensor group may be linked with the first through eighth IO sensors #1 IO through #8 IO, respectively, of the second sensor group.

The first through eighth IO sensors #1 IO through #8 IO of the gas cylinder transport apparatus 110 may communicate with the first through eighth IO sensors #1 IO through #8 IO, respectively, of the gas cylinder storage apparatus 120. In this case, if first through eighth IO sensors #1 IO through #8 IO of the gas cylinder transport apparatus 110 function as input sensors, the first through eighth IO sensors #1 IO through #8 IO of the gas cylinder storage apparatus 120 may function as output sensors, and vice versa.

The first through eighth IO sensors #1 IO through #8 IO of the gas cylinder transport apparatus 110 may control the ports of the gas cylinder storage apparatus 120 through first through eighth IO sensors #1 IO through #8 IO, respectively, of the gas cylinder storage apparatus 120, but the present disclosure is not limited thereto. Alternatively, the gas cylinder transport apparatus 110 may have only one IO sensor that can communicate with all the IO sensors installed in the gas cylinder storage apparatus 120.

As mentioned earlier, the gas cylinder transport apparatus 110 and the gas cylinder storage apparatus 120 remain in a standby state before entering the teaching mode S410. Referring to FIG. 9, in the standby state, the first through eighth IO sensors #1 IO through #8 IO of the gas cylinder transport apparatus 110 are off ("OFF"), and the first through eighth IO sensors #1 IO through #8 IO of the gas cylinder storage apparatus 120 are also off ("OFF"). FIG. 9 is an exemplary table explaining steps of the auto-teaching method between the gas cylinder transport apparatus 110 and the gas cylinder storage apparatus 120.

Thereafter, the gas cylinder transport apparatus 110 and the gas cylinder storage apparatus 120 sequentially enter the teaching mode under the control of the control apparatus 140 (S420). The gas cylinder transport apparatus 110 may enter the teaching mode first, followed by the gas cylinder storage apparatus 120, but the present disclosure is not limited thereto. Alternatively, the gas cylinder storage apparatus 120 may enter the teaching mode first, followed by the gas cylinder transport apparatus 110. Yet alternatively, both the gas cylinder transport apparatus 110 and the gas cylinder storage apparatus 120 may enter the teaching mode simultaneously.

FIG. 10 shows a case where the gas cylinder transport apparatus 110 and the gas cylinder storage apparatus 120 enter the teaching mode. Referring to FIG. 10, when the first through eighth IO sensors #1 IO through #8 IO of the first sensor group are changed from "OFF" to "ON" under the control of the control apparatus 140, the gas cylinder transport apparatus 110 may enter the teaching mode. Similarly, when the first through fourth IO sensors #1 IO through #4 IO of the second sensor group are changed from "OFF" to "ON," the gas cylinder storage apparatus 120 may also enter the teaching mode. FIG. 10 is another exemplary table explaining the steps of the auto-teaching method between the gas cylinder transport apparatus 110 and the gas cylinder storage apparatus 120.

Once both the gas cylinder transport apparatus 110 and the gas cylinder storage apparatus 120 have entered the teaching mode (S420), the gas cylinder transport apparatus 110 may sequentially approach each of the first, second, third, and fourth ports to teach the storage location of the gas cylinders 130 (S430).

When the gas cylinder transport apparatus 110 approaches any one of the first through fourth ports (S430), the gas cylinder storage apparatus 120 opens the door of the corresponding port under the control of the control apparatus 140. In this case, the doors of the adjacent ports may be closed (S440).

For example, referring to FIG. 11, if the gas cylinder transport apparatus 110 approaches the first port, the control apparatus 140 may change the operation state of the fifth IO sensor #5 IO of the gas cylinder storage apparatus 120 from "OFF" to "ON," while the sixth IO sensor #6 IO of the gas cylinder storage apparatus 120 may remain "OFF". The gas cylinder storage apparatus 120 may open the target door of the first port and close the door of the adjacent port (i.e., the second port). FIG. 11 is another exemplary table explaining the steps of the auto-teaching method between the gas cylinder transport apparatus 110 and the gas cylinder storage apparatus 120.

In the embodiment of FIG. 8, for auto-teaching, a single gas cylinder transport apparatus may sequentially approach each port, but alternatively, multiple gas cylinder transport apparatuses may be provided to simultaneously approach multiple ports.

For example, referring to FIG. 12, if one gas cylinder transport apparatus 110 approaches the first port and another gas cylinder transport apparatus 110 approaches the fourth port, the control apparatus 140 may change the operation state of the fifth and eighth IO sensors #5 IO and #8 IO of the gas cylinder storage apparatus 120 from "OFF" to "ON," while the sixth and seventh IO sensors #6 IO and #7 IO of the gas cylinder storage apparatus 120 may remain "OFF." The gas cylinder storage apparatus 120 may open the target door of the first port and close the adjacent door of the second port. Additionally, the gas cylinder storage apparatus 120 may also open the target door of the fourth port and close the adjacent door of the third port. FIG. 12 is another exemplary table explaining the steps of the auto-teaching method between the gas cylinder transport apparatus 110 and the gas cylinder storage apparatus 120.

The doors installed in the respective ports of the gas cylinder storage apparatus 120 may be sliding doors. Therefore, when the door of a particular port opens, the control apparatus 140 may prevent the adjacent port's door from opening. Alternatively, the doors installed in the respective ports of the gas cylinder storage apparatus 120 may be hinged doors, in which case, the control apparatus 140 may also prevent the adjacent port's door from opening when the door of the particular port opens. However, the present disclosure is not limited to these examples. If the doors installed in the respective ports of the gas cylinder storage apparatus 120 are hinged doors, the control apparatus 140 may allow the adjacent port's door to open even when the door of the particular port opens.

When the gas cylinder transport apparatus 110 approaches a particular port of the gas cylinder storage apparatus 120 (S430) and the door of the particular port opens (S440), the control apparatus 140 utilizes the gas cylinder transport apparatus 110 and the gas cylinder storage apparatus 120 to perform port teaching (S450). Here, port teaching refers to a process of teaching the storage location of the gas cylinders 130. Port teaching will hereinafter be described.

Figure 13:
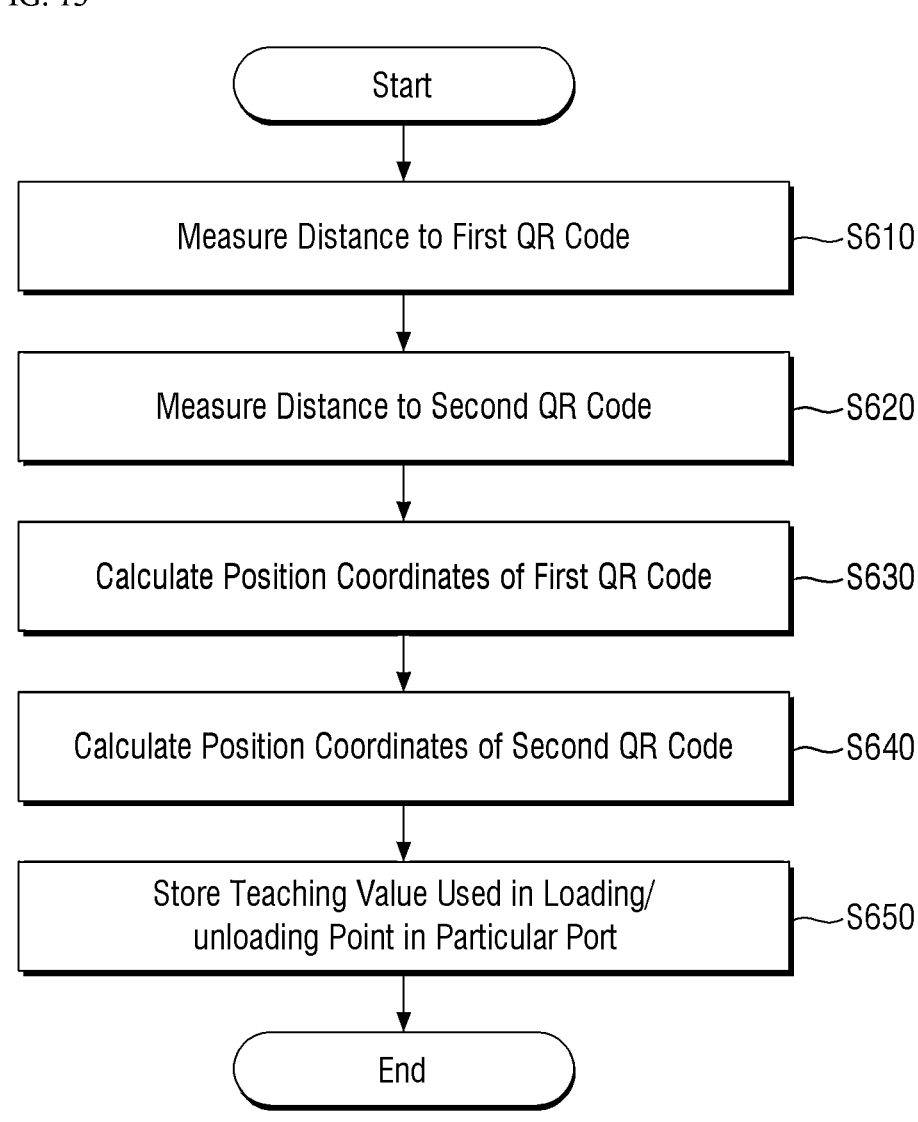
FIG. 13 is a flowchart illustrating a port teaching method between the gas cylinder transport apparatus and the gas cylinder storage apparatus.

FIG. 13 is a flowchart illustrating a port teaching method between the gas cylinder transport apparatus 110 and the gas cylinder storage apparatus 120 that constitutes the logistics system 100.

Two support blocks 321a and 321b, in which a gas cylinder 130 is placed, may be provided in parallel on either side of each port, and QR codes 322a and 322b may be installed on the support blocks 321a and 321b, respectively to provide identification information. The distance measuring sensor 260 may measure the distance to one of the QR codes 322a and 322b first and then measure the distance to the other QR code.

For convenience, the support block arranged on one side of each port may be defined as a first support block 321a, and the support block arranged on the other side of each port may be defined as a second support block 321b. Additionally, the QR code installed on the first support block 321a may be defined as a first QR code 322a, and the QR code installed on the second support block 321b may be defined as a second QR code 322b.

First, the distance measuring sensor 260 of the gas cylinder transport apparatus 110 measures the distance to a first QR code 322a installed on a first support block 321a of a particular port in the gas cylinder storage apparatus 120 (S610). Thereafter, the distance measuring sensor 260 measures the distance to a second QR code 322b installed on a second support block 321b of the same particular port (S620).

Alternatively, As mentioned earlier, the distance measuring sensor 260 may measure the distance to the second QR code 322b first and then measure the distance to the first QR code 322a.

Thereafter, the control apparatus 140 calculates the position coordinates of the first QR code 322a based on the current position of the gas cylinder transport apparatus 110 and the distance between the gas cylinder transport apparatus 110 and the first QR code 322a (S630). Similarly, the control apparatus 140 calculates the position coordinates of the second QR code 322b based on the current position of the gas cylinder transport apparatus 110 and the distance between the gas cylinder transport apparatus 110 and the second QR code 322b (S640).

Thereafter, the control apparatus 140 combines the position coordinates of the first QR code 322a and the second QR code 322b to store the combined position coordinates as teaching values (S650). The teaching values stored by the control apparatus 140 may be used as loading/unloading points for the gas cylinders 130.

S450 of FIG. 8 may be performed for all the ports provided in the gas cylinder storage apparatus 120. For example, if the gas cylinder storage apparatus 120 has four ports, i.e., the first through fourth ports, the gas cylinder transport apparatus 110 may sequentially approach the first through fourth ports in the gas cylinder storage apparatus 120 and perform port teaching under the control of the control apparatus 140 (S450).

S450 of FIG. 8 may not necessarily target all the ports in the gas cylinder storage apparatus 120, but may target only some of the ports. For example, if there are ports, among the four ports, that have not yet undergone port teaching, the gas cylinder transport apparatus 110 may approach the corresponding ports and perform port teaching on the corresponding ports (S450).

Alternatively, if there are ports, among the four ports, where the loading/unloading of the gas cylinders 130 has not been properly completed, the gas cylinder transport apparatus 110 may perform port teaching on the corresponding ports (S450).

Referring back to FIG. 8, once port teaching is complete (S450), the gas cylinder storage apparatus 120 closes the door of the particular port, which has undergone the port teaching, under the control of the control apparatus 140 (S460). In this case, the gas cylinder transport apparatus 110 requests the gas cylinder storage apparatus 120 to close the door of the particular port so that the door of the particular port can be closed.

Thereafter, the gas cylinder transport apparatus 110 and the gas cylinder storage apparatus 120 are released from the teaching mode under the control of the control apparatus 140 (S470). In this case, the control apparatus 140 may turn off all the IO sensors that are "ON" to release both the gas cylinder transport apparatus 110 and the gas cylinder storage apparatus 120 from the teaching mode.

In S470, one of the gas cylinder transport apparatus 110 and the gas cylinder storage apparatus 120 may be released from the teaching mode first, followed by the other apparatus. Alternatively, both the gas cylinder transport apparatus 110 and the gas cylinder storage apparatus 120 may be released from the teaching mode simultaneously.

For example, referring to FIG. 14, if the gas cylinder transport apparatus 110 is released from the teaching mode first, the control apparatus 140 may turn off the IO sensors of the gas cylinder transport apparatus 110 that are "ON," i.e., the first through eighth IO sensors #1 IO through #8 IO of the gas cylinder transport apparatus 110. FIG. 14 is another exemplary table explaining the steps of the auto-teaching method between the gas cylinder transport apparatus 110 and the gas cylinder storage apparatus 120.

Similarly, referring to FIG. 15, if the gas cylinder storage apparatus 120 is released from the teaching mode first, the control apparatus 140 may turn off the IO sensors of the gas cylinder storage apparatus 120 that are "ON," i.e., the first through fifth IO sensors #1 IO through #5 IO of the gas cylinder storage apparatus 120. FIG. 15 is another exemplary table explaining the steps of the auto-teaching method between the gas cylinder transport apparatus 110 and the gas cylinder storage apparatus 120.

Considering its mobility, the gas cylinder transport apparatus 110 may be powered by portable power (e.g., a battery), while the gas cylinder storage apparatus 120 may be powered by commercial power. In this case, for an efficient power management, the gas cylinder transport apparatus 110 may be released from the teaching mode before the gas cylinder storage apparatus 120 and may enter the teaching mode later than the gas cylinder storage apparatus 120.

The logistics system 100, which includes a mobile robot MR (or the gas cylinder transport apparatus 110) and a storage queue SQ (or the gas cylinder storage apparatus 120), and the auto-teaching method between the gas cylinder transport apparatus 110 and the gas cylinder storage apparatus 120 have been described.

In the teaching mode, the mobile robot MR uses a vision sensor or an LDS sensor to measure the QR labels on both sides of a target port's lower plate in the storage queue SQ. The mobile robot MR determines/calibrates the loading/unloading point's position in the target port based on the mobile robot MR's stationary position, acquires distance and angle information and calculates teaching coordinates based on the result of the determination/calibration, and stores teaching values. The loading/unloading of the gas cylinders 130 may be conducted based on the coordinates taught in loading/unloading mode.

During loading/unloading, the storage queue SQ may report the storage status of the gas cylinder 130 in each port to a higher-level master control system (MCS), a loading/unloading command for a target gas cylinder may be sent from the higher-level to the mobile robot MS and the storage queue SQ.

Conventionally, there is no auto-teaching feature between the mobile robot MS and the storage queue SQ. The present disclosure provides automating the entry into the teaching mode, teaching, and the release from the teaching mode between the mobile robot MS and the storage queue SQ, which are both equipped with an auto-teaching function. The present disclosure also provides an auto-teaching method using PIO sensors and methods of measuring and calibrating coordinates/tilts using vision sensors and LDS sensors.

According to the present disclosure, the transportation and storage of the gas cylinders 130 can be automated by the gas cylinder transport apparatus 110 and the gas cylinder storage apparatus 120, which are both equipped with the auto-teaching function. Consequently, accidents that may occur during the transportation and storage of the gas cylinders 130 can be significantly reduced.

Embodiments of the present disclosure have been described above with reference to the accompanying drawings, but the present disclosure is not limited thereto and may be implemented in various different forms. It will be understood that the present disclosure can be implemented in other specific forms without changing the technical spirit or gist of the present disclosure. Therefore, it should be understood that the embodiments set forth herein are illustrative in all respects and not limiting.

What is claimed is:

1. A logistics system comprising:
a gas cylinder transport apparatus transferring gas cylinders containing process gases;
a gas cylinder storage apparatus storing the gas cylinders; and
a control apparatus controlling the gas cylinder transport apparatus and the gas cylinder storage apparatus,
wherein the control apparatus performs auto-teaching for operations between the gas cylinder transport apparatus and the gas cylinder storage apparatus.

2. The logistics system of claim 1, wherein the control apparatus performs the auto-teaching for a loading/unloading position for each of the gas cylinders.

3. The logistics system of claim 1, wherein the gas cylinder transport apparatus and the gas cylinder storage apparatus include a plurality of parallel input/output (PIO) sensors, which communicate with one another.

4. The logistics system of claim 3, wherein
the gas cylinder storage apparatus includes a plurality of ports, which provide storage spaces for the gas cylinders, and
the PIO sensors allow the ports to enter teaching mode, and open or close doors installed in the ports.

5. The logistics system of claim 1, wherein when the gas cylinder transport apparatus approaches the gas cylinder storage apparatus, at least one of a plurality of doors installed in the gas cylinder storage apparatus is closed based on a position of the gas cylinder transport apparatus.

6. The logistics system of claim 5, wherein the at least one of the plurality of doors is adjacent to a target door that the gas cylinder storage apparatus is to open.

7. The logistics system of claim 1, wherein the control apparatus approaches one of ports in the gas cylinder storage apparatus and performs port teaching on the corresponding port when a door installed in the corresponding port opens.

8. The logistics system of claim 7, wherein
support blocks, in which each of the gas cylinders is to be placed, are installed in each of the ports, and
the port teaching includes calculating a position of the support blocks based on identification information installed on the support blocks and storing the calculated position as a loading/unloading position for each of the gas cylinders.

9. The logistics system of claim 8, wherein the identification information is QR code.

10. The logistics system of claim 8, wherein
the gas cylinder transport apparatus includes a distance measuring sensor, and
the control apparatus calculates the position of the support blocks based on a distance between the gas cylinder transport apparatus and the support blocks, measured by the distance measuring sensor.

11. The logistics system of claim 10, wherein the control apparatus uses the position of the gas cylinder transport apparatus when calculating the position of the support blocks.

12. The logistics system of claim 7, wherein the door is closed when the port teaching is complete.

13. The logistics system of claim 1, wherein the gas cylinder transport apparatus enters and is released from a teaching mode ahead of the gas cylinder storage apparatus.

14. The logistics system of claim 1, wherein loading/unloading of the gas cylinders is performed after the auto-teaching.

15. The logistics system of claim 1, wherein the control apparatus performs the auto-teaching in an order of the entry into a teaching mode, port teaching, and the release from the teaching mode.

16. A logistics system comprising:
a gas cylinder transport apparatus transferring gas cylinders containing process gases, the gas cylinder transport apparatus including a distance measuring sensor;
a gas cylinder storage apparatus storing the gas cylinders, the gas cylinder storage apparatus including a plurality of ports, which provide storage spaces for the gas cylinders, and support blocks, which are installed in each of the ports and in which each of the gas cylinders is placed; and
a control apparatus controlling the gas cylinder transport apparatus and the gas cylinder storage apparatus,
wherein
the control apparatus performs auto-teaching for operations between the gas cylinder transport apparatus and the gas cylinder storage apparatus in an order of the entry into a teaching mode, port teaching, and the release from the teaching mode,
the port teaching includes calculating a position of the support blocks based on identification information installed on the support blocks and storing the calculated position as a loading/unloading position for each of the gas cylinders,
the control apparatus calculates the position of the support blocks based on a distance between the gas cylinder transport apparatus and the support blocks, measured by the distance measuring sensor,
the gas cylinder transport apparatus and the gas cylinder storage apparatus include a plurality of parallel input/output (PIO) sensors, which communicate with one another, and
the PIO sensors allow the ports to enter the teaching mode, and open or close doors installed in the ports.

17. A control apparatus controlling a gas cylinder transport apparatus, which transfers gas cylinders containing process gases, and a gas cylinder storage apparatus, which stores the gas cylinders,
wherein
the control apparatus performs auto-teaching for operations between the gas cylinder transport apparatus and the gas cylinder storage apparatus in an order of the entry into a teaching mode, port teaching, and the release from the teaching mode, and
loading/unloading of the gas cylinders is performed after the auto-teaching.

18. The control apparatus of claim 17, wherein the port teaching includes calculating a position of support blocks within the gas cylinder storage apparatus, in which each of the gas cylinders is placed, based on identification information installed on the support blocks and storing the calculated position as a loading/unloading position for each of the gas cylinders.

19. The control apparatus of claim 18, wherein the control apparatus calculates the position of the support blocks based on a position of the gas cylinder transport apparatus and a distance between the gas cylinder transport apparatus and the support blocks.

20. The control apparatus of claim 17, wherein
the gas cylinder transport apparatus and the gas cylinder storage apparatus include a plurality of parallel input/output (PIO) sensors, which communicate with one another, and the control apparatus allows the gas cylinder transport apparatus and the gas cylinder storage apparatus to enter the teaching mode and manipulates doors, which open or close the interior of the gas cylinder storage apparatus during the port teaching, using the PIO sensors.

\* \* \* \* \*